United States Patent
Hou et al.

(10) Patent No.: US 10,402,402 B2
(45) Date of Patent: Sep. 3, 2019

(54) METHOD, DEVICE, SERVER AND STORAGE APPARATUS OF REVIEWING SQL

(71) Applicant: PING AN TECHNOLOGY (SHENZHEN) CO., LTD., Shenzhen, Guangdong (CN)

(72) Inventors: Song Hou, Guangdong (CN); Yeung Wong, Guangdong (CN)

(73) Assignee: PING AN TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 128 days.

(21) Appl. No.: 15/579,376

(22) PCT Filed: May 9, 2017

(86) PCT No.: PCT/CN2017/083645
§ 371 (c)(1),
(2) Date: Dec. 4, 2017

(87) PCT Pub. No.: WO2018/058959
PCT Pub. Date: Apr. 5, 2018

(65) Prior Publication Data
US 2019/0228008 A1    Jul. 25, 2019

(30) Foreign Application Priority Data
Sep. 28, 2016  (CN) .......................... 2016 1 0860550

(51) Int. Cl.
*G06F 17/30*   (2006.01)
*G06F 16/2453*   (2019.01)
(Continued)

(52) U.S. Cl.
CPC ...... *G06F 16/2454* (2019.01); *G06F 11/3433* (2013.01); *G06F 16/217* (2019.01)

(58) Field of Classification Search
USPC ......................................................... 707/713
See application file for complete search history.

(56) References Cited

U.S. PATENT DOCUMENTS 6,052,687 A * 4/2000 Miura ..................... G06F 16/94
2008/0140627 A1   6/2008 Bossman et al.
(Continued)

FOREIGN PATENT DOCUMENTS

CN   101021874 A   8/2007
CN   102411633 A   4/2012
(Continued)

OTHER PUBLICATIONS

European Search Report dated Mar. 19, 2019 issued in a corresponding European patent application, pp. 1-7.
(Continued)

*Primary Examiner* — Hung T Vy
(74) *Attorney, Agent, or Firm* — Polsinelli PC

(57) ABSTRACT

A method of reviewing SQL includes: obtaining slow log data; extracting a SQL sentence to be reviewed and basic information matched with the SQL sentence from the slow log data; identifying and parsing the SQL sentence to obtain a parsed result; reviewing the parsed result and/or the basic information in accordance with review items in a preset review template one by one to obtain a review result; and generating a review result set according to the review result.

10 Claims, 7 Drawing Sheets

(51) Int. Cl.
  *G06F 11/34* (2006.01)
  *G06F 16/21* (2019.01)

(56) References Cited

U.S. PATENT DOCUMENTS

| | | | |
|---|---|---|---|
| 2009/0077016 A1 | 3/2009 | Belknap et al. | |
| 2010/0153431 A1 | 6/2010 | Burger | |
| 2014/0189526 A1* | 7/2014 | Chen | G06F 16/2358 715/745 |
| 2017/0039128 A1* | 2/2017 | Freschl | G06F 16/25 |

FOREIGN PATENT DOCUMENTS

| | | | |
|---|---|---|---|
| CN | 104391995 A | 3/2015 | |
| CN | 104679646 A | 6/2015 | |
| CN | 104965861 A | 10/2015 | |
| CN | 105243147 A | 1/2016 | |
| CN | 105653607 A | 6/2016 | |

OTHER PUBLICATIONS

Japanese Office Action dated Feb. 19, 2019 issued in a corresponding Japanese patent application, pp. 1-5.
Why is your SQL slow (English language abstract).
Office Action dated Oct. 11, 2018 issued in the corresponding Australian patent application, pp. 1-6.
Office Action dated Oct. 30, 2018 issued in the corresponding Japanese patent application, pp. 1-4.
Office Action Oct. 23, 2018 issued in the corresponding Chinese patent application, pp. 1-8.
H. K. Khanuja et al., "A Framework for Database Forensic Analysis", Computer Science & Engineering: An International Journal (CSEIJ), Jun. 2012, vol. 2, No. 3, pp. 27-41.
Let's Measure and Find Slow SQL Analysis of Slow Query Log and Way of Reading Execution Plan.
SQL Inspection for Quality Assurance of Data Access Layer.
New Functions for Operations Management/High Availability Enhancing Coordination Between Production Environment and Test Environment, Also Possible to Store Data Past a Particular Point in Time.
Office Action dated Feb. 27, 2018 issued in the corresponding Taiwanese patent application, pp. 1-8.
International Search Report dated Aug. 16, 2017 issued in International Application No. PCT/CN2017/083645, 2 Pages.
English translation of the Written Opinion of the International Searching Authority dated Aug. 16, 2017 issued in International Application No. PCT/CN2017/083645, 6 Pages.
International Search Report with English Translation dated Aug. 16, 2017 issued in the corresponding International Application No. PCT/CN2017/083645, pp. 1-5.

* cited by examiner

METHOD, DEVICE, SERVER AND STORAGE APPARATUS OF REVIEWING SQL

CROSS REFERENCE TO RELATED APPLICATIONS

The present application is a National Phase filing under 35 U.S.C. § 371 of PCT/CN2017/083645, filed May 9, 2017, which claims the benefit of Chinese patent Application No. 201610860550X, entitled "METHOD AND DEVICE OF REVIEWING SQL" filed on Sep. 28, 2016, the entire contents of which are incorporated herein in their entireties.

FIELD OF THE INVENTION

The present disclosure relates to the technical field of database, and particularly to a method, a device, a server and a storage apparatus of reviewing SQL.

BACKGROUND OF THE INVENTION

In work of a database, it often needs to review SQL (Structured Query Language) sentences performed by the database, so as to avoid SQL sentences of poor performance entering into the production system which can result in decrease in the whole performance of the database. For some data dictionary incomplete information database, such as MYSQL, Postgres and other database, SQL review in the conventional manner can parse SQL sentences only by the SQL script to perform some simple review works, and cannot review SQL more deeply, such as SQL execution plan review, resulting in inaccurate SQL review.

SUMMARY OF THE INVENTION

According to various embodiments of the present disclosure, a method, a device, a server and a storage apparatus of reviewing SQL are provided.

A method of reviewing SQL includes:
obtaining slow log data;
extracting a SQL sentence to be reviewed and basic information matched with the SQL sentence from the slow log data;
identifying and parsing the SQL sentence to obtain a parsed result;
reviewing the parsed result and/or the basic information in accordance with review items in a preset review template one by one to obtain a review result;
and
generating a review result set according to the review result.

A device of reviewing SQL includes:
an obtaining module configured to obtain slow log data;
an extracting module configured to extract a SQL sentence to be reviewed and basic information matched with the SQL sentence from the slow log data;
a parsing module configured to identify and parse the SQL sentence to obtain a parsed result;
a reviewing module configured to review the parsed result and/or the basic information in accordance with review items in a preset review template one by one to obtain a review result; and
a generating module configured to generate a review result set according to the review result.

A server includes: a processor and a memory storing computer executable instructions that, when executed by the processor, cause the processor to perform operations including:
obtaining slow log data;
extracting a SQL sentence to be reviewed and basic information matched with the SQL sentence from the slow log data;
identifying and parsing the SQL sentence to obtain a parsed result;
reviewing the parsed result and/or the basic information in accordance with review items in a preset review template one by one to obtain a review result;
and
generating a review result set according to the review result.

One or more storage apparatus storing computer executable instructions that, when executed by the one or more processors, cause the one or more processors to perform the steps as follows:
obtaining slow log data;
extracting a SQL sentence to be reviewed and basic information matched with the SQL sentence from the slow log data;
identifying and parsing the SQL sentence to obtain a parsed result;
reviewing the parsed result and/or the basic information in accordance with review items in a preset review template one by one to obtain a review result; and
generating a review result set according to the review result.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The above objects, features and advantages of the present invention will become more apparent by describing in detail embodiments thereof with reference to the accompanying drawings. It should be understood that these embodiments depicted herein are only used to illustrate the present invention and are not therefore to limit the present invention.

Figure 1:
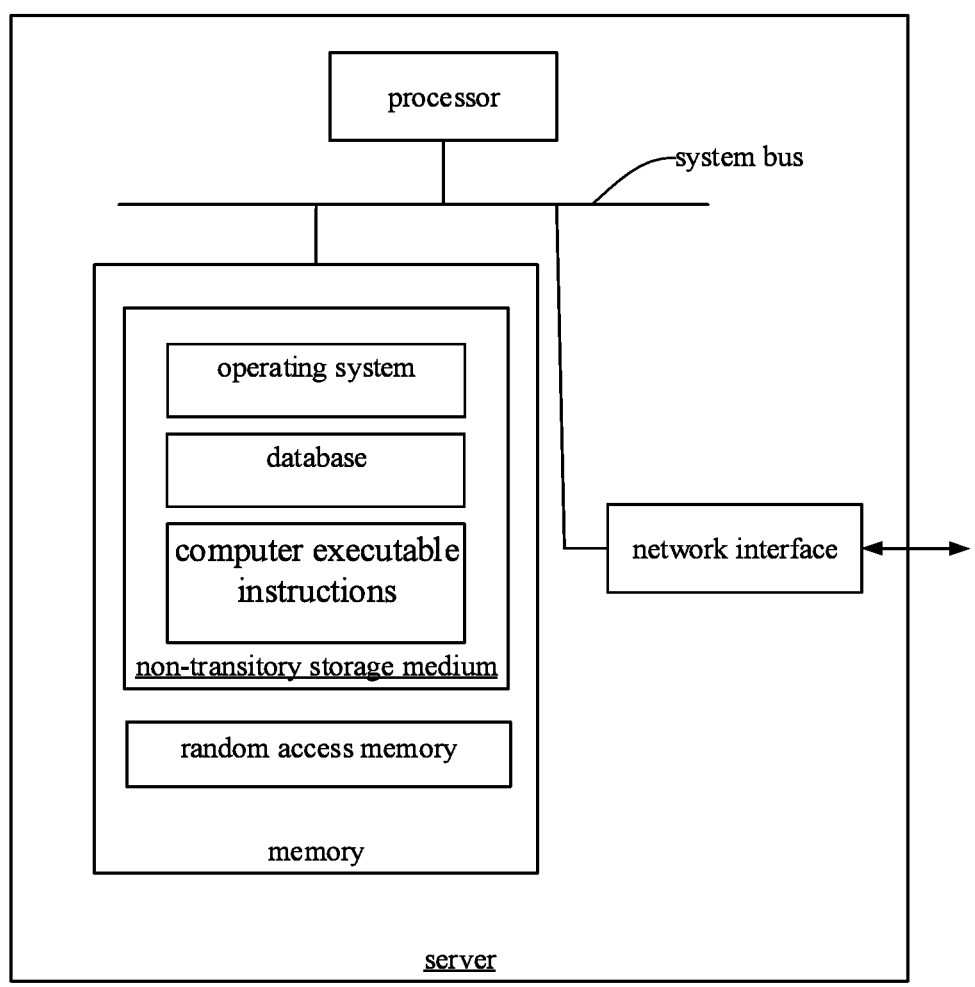
FIG. 1 is a block diagram of a server in an embodiment.

FIG. 1 is a block diagram of a server in an embodiment. Referring to FIG. 1, the server includes a processor, a memory and a network interface connected via a system bus. The processor of the server is configured to provide calculation and control capabilities to support operation of the entire server. The memory of the server is configured to store data, instruction codes and the like. In an embodiment, the memory may include a non-transitory storage medium and a RAM (Random Access Memory). The non-transitory storage medium stores an operating system, a database and computer executable instructions. The database stores slow log data. The computer executable instructions may be configured to implement the method of reviewing SQL applied to the server provided in the embodiment. The RAM provides a running environment to the operating system and the computer executable instructions in the non-transitory storage medium. The network interface of the server is configured to perform a network communication with an external terminal by network connection, such as to receive a modified SQL sentence sent by the terminal, return review data to the terminal. The server may be implemented by an individual server or a server cluster composed by a plurality of servers. Those skilled in the art can understand that the structure shown in FIG. 1 is only a block diagram of the partial structure associated with the present solution and does not limit the server to which the present solution is applied, and the particular server may include more or fewer parts shown in the drawing, or combine certain parts, or have a different arrangement of parts.

Figure 2:
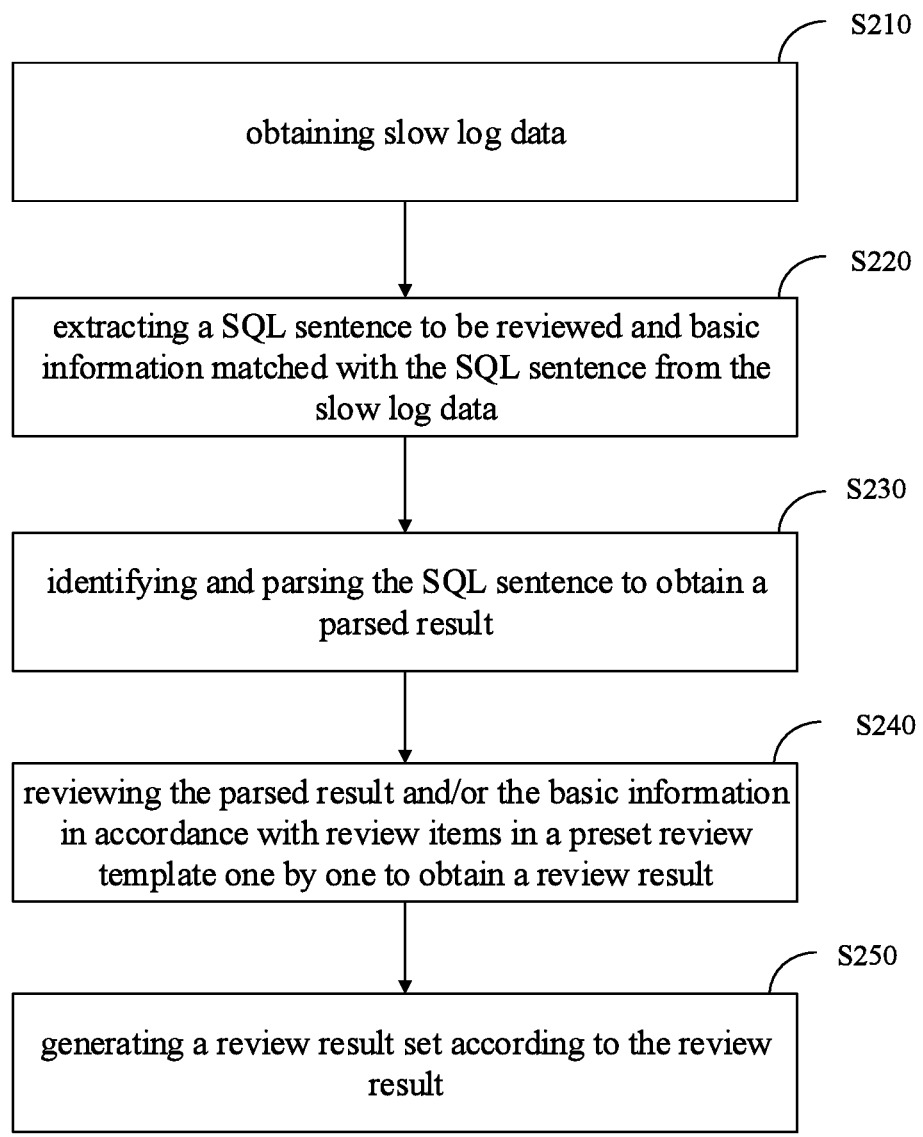
FIG. 2 is a flow chart of a method of reviewing SQL in an embodiment.

Referring to FIG. 2, in an embodiment, a method of reviewing SQL is provided, which can be applied to the server shown in FIG. 1. The method includes the following steps:

In step S210, slow log data is obtained.

The server can obtain slow log data from the target database with incomplete data dictionary information, for example, MySQL, Postgres and other target databases, by means of an external linking table, wherein the slow log data refers to the slow query log data. The SQL sentence query which exceeds the specified time in the database is called "slow query". The slow log data records SQL sentences which exceed the specified time, and the related data generated when SQL sentences are executed such as the log time, the storage location, the execution time, the executor number.

In step S220, a SQL sentence to be reviewed and basic information matched with the SQL sentence are extracted from the slow log data.

The server can extract the SQL sentence to be reviewed and the basic information matched with the SQL sentence to be reviewed which is required to review the SQL sentence from the obtained slow log data. The basic information can be extracted according to a review item in the preset review template. The basic information may include the number of executions, the total execution time, the execution operation, the execution cost, and the like. By extracting the SQL sentence to be reviewed from the slow log data, the SQL sentence is filtered. The SQL sentence of good performance is filtered according to the execution time of the SQL sentence. The SQL sentence of poor performance which exceeds the specified time is reviewed.

In an embodiment, the step S220 of extracting the SQL sentence to be reviewed and basic information matched with the SQL sentence from the slow log data includes (a) and (b):

(a) the slow log data is analyzed according to a preset format and a slow log data list is generated.

The server can analyze the slow log data and extract data in the slow log data according to the preset format. The preset format can be set according to the actual requirements. For example, if the preset format can include the field name, the field type and the field content, then each field name, the field type and the field content corresponding to the field name are extracted in the slow log data. The slow log data list can be generated from the data extracted from the slow log data according to the preset format. The format content of the slow log data list corresponds to the preset format and the extracted data. For example, the slow log data list can be shown in Table 1:

TABLE 1

| field name | field type | field content |
| --- | --- | --- |
| log_time | Timestamp(3)with time zone | 20160523 |
| user_name | text | ZhangSan |
| database_name | text | DB1 |
| userid | oid | 267975431 |
| calls | bigint | 5 |
| total_time | Double precision | 35 |

Wherein, log_time is the log time, user_name is the user name, database_name is the database name, userid is the user number, calls is the number of executions, total_time is the total execution time. It can be understood that the content and format of the slow log data list is not limited to the content and format shown in Table 1.

(b) the SQL sentence to be reviewed and the basic information matched with the SQL sentence are extracted from the slow log data list according to the field name in the slow log data list.

The server can extract the field name "query" in the slow log data list, that is to say, the field name serves as the SQL sentence to be reviewed for the field content of the executed sentence. The corresponding basic information matched with the SQL sentence is extracted from the slow log data list according to the review item in the preset review template. For example, if the review item in the preset review template includes the execution time, the filed name "calls" and the field content "total_time" are extracted from the slow log data list as the basic information matched with the SQL sentence.

In step S230, the SQL sentence is identified and parsed to obtain a parsed result.

The server can identify and parse the SQL sentence extracted from the slow log data to obtain the parsed result which can be identified by the review template. In the embodiment, the SQL tree parsed result can be obtained after parsing the SQL sentence, which can facilitate reviewing the parsed result in accordance with the review item in the review template.

In step S240, the parsed result and/or the basic information are reviewed in accordance with review items in a preset review template one by one to obtain a review result.

The preset review template may include an execution plan review template and a SQL grammar review template. The execution plan review template is configured to review the execution plan of the SQL sentence. In the database, a SQL sentence indicates the expected data, but it does not indicate how to obtain the expected data. For example, by a SQL sentence, all customers that live in Shenzhen City can be extracted. When the database in the server receives this SQL, by calculation the database will choose to read the entire customer table or use the index to obtain data. Finally, the method of executing the SQL sentence physically is called as the execution plan. The review items of the execution plan review template may include the slow query, the high cost operation and the like. The SQL grammar review template is configured to review the syntax and semantics of the SQL sentence itself. The review items of the SQL grammar review template can include prohibiting from repeating the query clause, prohibiting from appearing "select *" and the like. The server can review the parsed result and/or the basic information in accordance with review items in a preset review template one by one to obtain the review result. When any review item in the review template is not satisfied, the review is not passed, when all review items in the review template are satisfied, the review is passed.

In step S250, a review result set is generated according to the review result.

The server can review a plurality of SQL sentences and the basic information matched with each SQL sentence extracted from the slow log data, and generate the review result set according to the review result. The review result set may include the SQL number of the reviewed SQL sentence, the database name, the execution time, the command type, the review status, the illegal items and the like, and the review result set is stored in the review database, wherein the review status indicates the review result. Number "0", "1" and other numbers or other letters, symbols or the like can indicate that the review result is not passed or is passed.

The above method of reviewing SQL extracts the SQL sentence to be reviewed and basic information matched with the SQL sentence from the slow log data, reviews the parsed result obtained by parsing the SQL sentence and the basic information matched with the SQL sentence. By digging and analyzing the slow log data, the SQL sentence and the basic information matched with the SQL sentence which can be performed by a SQL deep review can be expanded from the database with incomplete data dictionary information, so that the SQL review is more targeted and the accuracy of the SQL review is improved efficiently.

Figure 3:
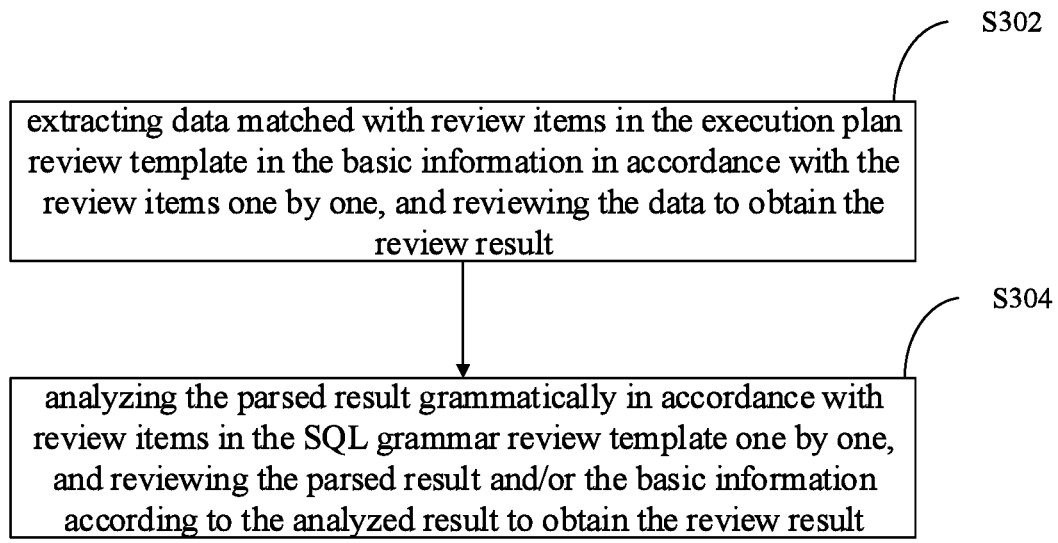
FIG. 3 is a flow chart of a method of performing the review in accordance with review items in a preset review template in an embodiment.

Referring to FIG. 3, in an embodiment, the step S240 of reviewing the parsed result and/or the basic information in accordance with review items in the preset review template one by one to obtain the review result can include: step S302 and step S304:

In step S302, data matched with review items in the execution plan review template in the basic information are extracted and reviewed in accordance with the review items one by one to obtain the review result.

The preset review template can include the execution plan review template and the SQL grammar review template. The execution plan review template is configured to review the execution plan of the SQL sentence. The review items in the execution plan review template may include items such as the slow query, the high cost operation and the like. The review content of the slow query is to determine whether the execution time of the SQL sentence is greater than the preset execution time, for example, whether the execution time is greater than 1 s (second). The high cost operation of the review content is to determine whether there is a high cost operation in the SQL sentence, for example, whether there are operations such as Seq Scan (sequence scan), full table scan and the like. The content reviewed by review items of the execution plan review template is generally obtained from the basic information matched with the SQL sentence. For example, whether the review execution time is greater than the preset execution time, it needs to obtain the total number of executions and the total execution time from the basic information to obtain the average value, that is, the execution time. It needs to obtain the execution operation in the basic information to review the high cost operation. Each review item has a unique review item number. When the review is not passed, the unpassed review item number can be recorded.

In step S304, the parsed result is analyzed grammatically in accordance with review items in the SQL grammar review template one by one, and the parsed result and/or the basic information is reviewed according to the analyzed result to obtain the review result.

The SQL grammar review template is configured to review the syntax and semantics of the SQL sentence itself. The review items of the SQL grammar review template may include prohibiting from using "select *", prohibiting from repeating the query clause, update while prohibiting from using the order by clause, update while must using the where clause, prohibiting from nesting the select clause, delete while must using the where clause, delete while prohibiting the order by clause, delete while prohibiting from using the limit clause and the like. The review items of prohibiting from repeating the query clause can improve the execution efficiency of the SQL sentence. The review items of update while prohibiting from using the order by clause, delete while prohibiting the order by clause and delete while prohibiting from using the limit clause can prevent from unnecessary ordering in DML (Data Manipulation Language) process. The review items of update while must using the where clause and delete while must using the where clause can prevent the full table lock in the DML process. The SQL tree parsed result is analyzed and reviewed in accordance with each review item in the SQL grammar review template one by one to obtain the review result.

Each review item in the preset review template can correspond to different review values to score the reviewed SQL sentence. When the review item is not passed, the review values corresponding to the unpassed review items will be deducted from the total review values of the SQL sentence. After the review is completed, the final review value can be obtained. The performance of the SQL sentence can be clearly obtained by scoring the SQL sentence. For example, the review data corresponding to the slow query and the high cost operation in the execution plan review template are 1 point and 2 points respectively. The total review value of the SQL sentence is 100 points. If the SQL sentence does not satisfy the review items of the slow query, 1 point will be deducted, and the final review value is 99 points.

In the embodiment, the parsed result obtained by parsing the SQL sentence and/or the basic information matched with the SQL sentence is reviewed in accordance with the execution plan review template and the SQL grammar review template one by one. SQL in the database with the incomplete data dictionary information can be reviewed more deeply, so that the SQL review is more targeted and the accuracy of SQL review can be improved effectively.

Figure 4:
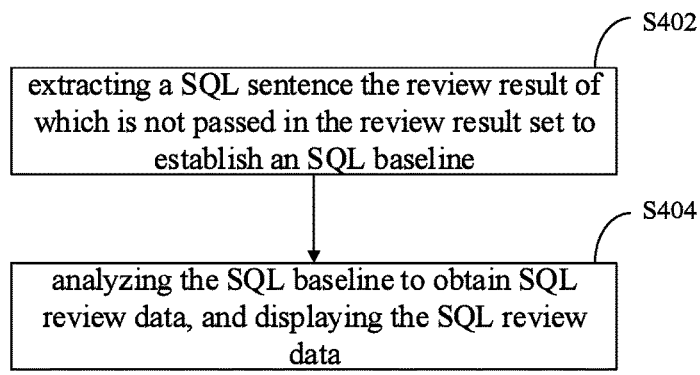
FIG. 4 is a flow chart of establishing and analyzing a baseline in an embodiment.

Referring to FIG. 4, in an embodiment, after the step S250 of generating the review result set according to the review result, the method further includes the following step:

In step S402, a SQL sentence the review result of which is not passed is extracted in the review result set to establish a SQL baseline.

The SQL baseline is configured to record data related to the SQL sentence the review result of which is not passed and the change process of status. The SQL baseline can include the SQL sentence content, the SQL number, the database name, the user name, the review item number the review result of which is not passed, the review status and the like. When the SQL baseline is established, the review status is non-pass. When the database administrator rectifies the SQL sentence, the review status can be modified as pass.

Figure 5:
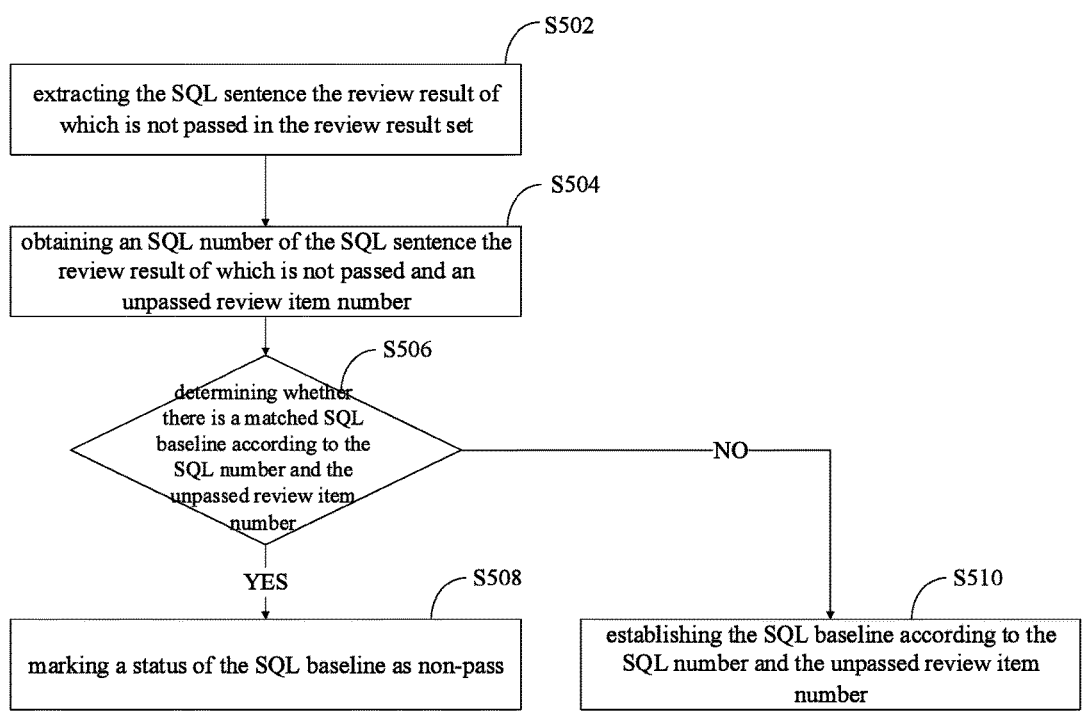
FIG. 5 is a flow chart of establishing a baseline in an embodiment.

Referring to FIG. 5, in an embodiment, the step S402 of extracting the SQL sentence the review result of which is not passed in the review result set to establish the SQL baseline includes:

In step S502, the SQL sentence the review result of which is not passed is extracted in the review result set.

In step S504, a SQL number of the SQL sentence the review result of which is not passed and an unpassed review item number are obtained.

The server can extract the SQL sentence the review result of which is not passed in the review result set to establish the SQL baseline, can obtain the SQL sentence content and the SQL number of the SQL sentence the review result of which is not passed, the database name, the user name, the unpassed review item number and other information.

In step S506, whether there is a matched SQL baseline according to the SQL number and the unpassed review item number is determined. If yes, the step S508 is performed; or else, the step S510 is performed.

Each unpassed review item of the SQL sentence can correspond to a unique SQL baseline, that is to say, each SQL baseline has a unique corresponding SQL number and an unpassed review item number. If there are a plurality of unpassed review items of the SQL sentence, it needs to establish a plurality of corresponding SQL baselines. After the server extracts the SQL sentence the review result of which is not passed in the review result set and obtain the SQL number and the unpassed review item number, it can firstly find in the review database whether there is a corresponding SQL baseline according to the SQL number. If yes, then it further finds whether there is a SQL baseline matched with the review item number from the SQL baseline corresponding to the SQL number. If yes, it is not necessary to reestablish the SQL baseline, and it only needs to modify the review status of the matched SQL baseline as non-pass.

In step S508, the status of the SQL baseline is marked as non-pass.

In step S510, the SQL baseline is established according to the SQL number and the unpassed review item number.

If there is no SQL baseline matched with the SQL number and the unpassed review item number, then the SQL baseline is established in the review database according to the SQL number and the unpassed review item number, and the review status in the SQL baseline is marked as non-pass.

In step S404, the SQL baseline is analyzed to obtain SQL review data, and the SQL review data is displayed.

In an embodiment, the server can extract a newly established SQL baseline or a baseline the status of which is remarked as non-pass at a preset time interval from the review database during a preset time period to obtain the review data of SQL, such as at one-hour interval, at three-hour interval and the like. The SQL review data can include the SQL sentence content, the SQL number, the database name, the user name, the review item number the review result of which is not passed and other contents, and can be displayed by the terminal. The database administrator can modify the SQL sentence according to the displayed SQL review data to make it conform to the review item. After modification is completed, the review status of the SQL baseline can be modified according to the modified result. If the review item of the SQL sentence the review result is not passed has been modified, the review status of the SQL baseline matched with the modified review item number can be marked as pass. In other embodiments, a baseline report may be generated at a time period, for example, a baseline daily report is generated and a baseline monthly report is generated. All newly generated SQL baselines and the SQL baselines the review statuses of which have been modified are recorded in the baseline report during the time period, so that the database administrator is convenient to understand changes in the SQL baseline in the review database.

In the embodiment, the SQL sentence the review result of which is not passed is extracted in the review result set to establish the SQL baseline, so that the database administrator is convenient to modify the SQL sentence the review result of which is not passed in the database, which improves the efficiency of SQL review work efficiently, and facilitates enhancing data processing performance of the database.

Figure 6:
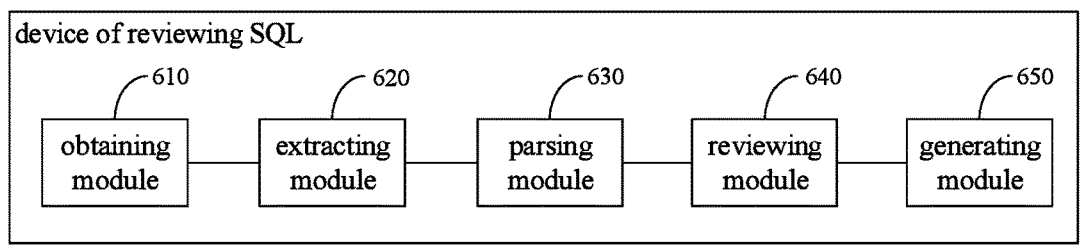
FIG. 6 is a block diagram of a device of reviewing SQL in an embodiment.

Referring to FIG. 6, in an embodiment, a device of reviewing SQL is provided. The device includes an obtaining module 610, an extracting module 620, a parsing module 630, a reviewing module 640 and a generating module 650.

The obtaining module 610 is configured to obtain slow log data.

The server can obtain slow log data from the target database with incomplete data dictionary information, for example, MySQL, Postgres and other target databases, by the way of an external linking table, wherein the slow log data refers to the slow query log data. The SQL sentence query which exceeds the specified time in the database is called "slow query". The slow log data records SQL sentences which exceed the specified time, and the related data generated when SQL sentences are executed such as the log time, the storage location, the execution time, the executor number and the like.

The extracting module 620 is configured to extract a SQL sentence to be reviewed and basic information matched with the SQL sentence from the slow log data.

The server can extract the SQL sentence to be reviewed and the basic information matched with the SQL sentence to be reviewed which is required to review the SQL sentence from the obtained slow log data. The basic information can be extracted according to a review item in the preset review template. The basic information may include the number of executions, the total execution time, the execution operation, the execution cost, and the like. By extracting the SQL sentence to be reviewed from the slow log data, the SQL sentence is filtered. The SQL sentence of good performance is filtered according to the execution time of the SQL sentence. The SQL sentence of poor performance which exceeds the specified time is reviewed.

Figure 7:
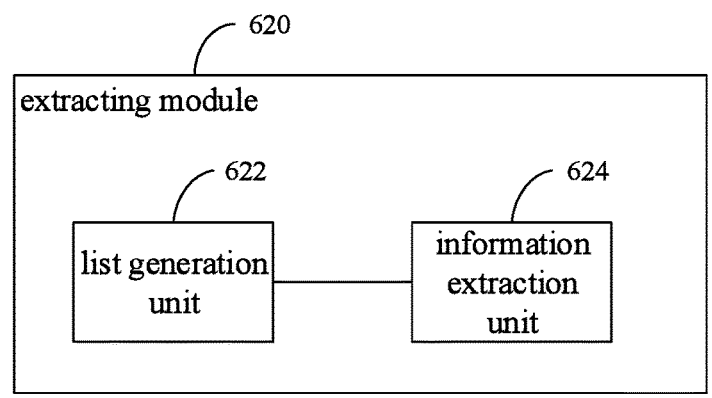
FIG. 7 is a block diagram of an extracting module in an embodiment.

Referring to FIG. 7, in an embodiment, the extracting module 620 includes a list generation unit 622 and an information extraction unit 624.

The list generation unit 622 is configured to analyze the slow log data according to a preset format and generate a slow log data list.

The server can analyze the slow log data and extract data in the slow log data according to the preset format. The preset format can be set according to the actual requirements. For example, if the preset format can include the field name, the field type and the field content, then each field name, the field type and the field content corresponding to the field name are extracted in the slow log data. The slow log data list can be generated from the data extracted from the slow log data according to the preset format. The format content of the slow log data list corresponds to the preset format and the extracted data. For example, the slow log data list can be shown in Table 1; wherein, log_time is the log time, user_name is the user name, database_name is the database name, userid is the user number, calls is the number of executions, total_time is the total execution time. It can be understood that the content and format of the slow log data list are not limited to the content and format shown in Table 1.

The information extraction unit 624 is configured to extract the SQL sentence to be reviewed and the basic information matched with the SQL sentence from the slow log data list according to a field name in the slow log data list.

The server can extract the field name "query" in the slow log data list, that is to say, the field name serves as the SQL sentence to be reviewed for the field content of the executed sentence. The corresponding basic information matched with the SQL sentence is extracted from the slow log data list according to the review item in the preset review template. For example, if the review item in the preset review template includes the execution time, the filed name "calls" and the field content "total_time" are extracted from the slow log data list as the basic information matched with the SQL sentence.

The parsing module 630 is configured to identify and parse the SQL sentence to obtain a parsed result.

The server can identify and parse the SQL sentence extracted from the slow log data to obtain the parsed result which can be identified by the review template. In the embodiment, the SQL tree parsed result can be obtained after parsing the SQL sentence, which can facilitate reviewing the parsed result in accordance with the review item in the review template.

The reviewing module 640 is configured to review the parsed result and/or the basic information in accordance with review items in a preset review template one by one to obtain the review result.

The preset review template may include an execution plan review template and a SQL grammar review template. The execution plan review template is configured to review the execution plan of the SQL sentence. In the database, a SQL sentence indicates the expected data, but it does not indicate how to obtain the expected data. For example, by a SQL sentence, all customers that live in Shenzhen City can be extracted. When the database in the server receives this SQL, by calculation the database will choose to read the entire customer table or use the index to obtain data. Finally, the method of executing the SQL sentence physically is called as the execution plan. The review items of the execution plan review template may include the slow query, the high cost operation and the like. The SQL grammar review template is configured to review the syntax and semantics of the SQL sentence itself. The review items of the SQL grammar review template can include prohibiting from repeating the query clause, prohibiting from appearing "select *" and the like. The server can review the parsed result and/or the basic information in accordance with review items in a preset review template one by one to obtain the review result. When any review item in the review template is not satisfied, the review is not passed. When all review items in the review template are satisfied, the review is passed.

The generating module 650 is configured to generate a review result set according to the review result.

The server can review a plurality of SQL sentences and the basic information matched with each SQL sentence extracted from the slow log data, and generate the review result set according to the review result. The review result set may include the SQL number of the reviewed SQL sentence, the database name, the execution time, the command type, the review status, the illegal items and the like, and the review result set is stored in the review database, wherein the review status indicates the review result. Number "0", "1" and other numbers or other letters, symbols or the like can indicate that the review result is not passed or is passed.

The above method of reviewing SQL extracts the SQL sentence to be reviewed and basic information matched with the SQL sentence from the slow log data; reviews the parsed result obtained by parsing the SQL sentence and the basic information matched with the SQL sentence. By digging and analyzing the slow log data, the SQL sentence and the basic information matched with the SQL sentence which can be performed by a SQL deep review can be expanded from the database with incomplete data dictionary information, so that the SQL review is more targeted and the accuracy of the SQL review is improved efficiently.

In an embodiment, the reviewing module 640 is further configured to extract and review data matched with review items in the execution plan review template in the basic information in accordance with the review items one by one to obtain the review result.

The preset review template can include the execution plan review template and the SQL grammar review template. The execution plan review template is configured to review the execution plan of the SQL sentence. The review items in the execution plan review template may include items such as the slow query, the high cost operation and the like. The review content of the slow query is to determine whether the execution time of the SQL sentence is greater than the preset execution time. For example, whether the execution time is greater than 1 s (second). The high cost operation of the review content is to determine whether there is a high cost operation in the SQL sentence. For example, whether there are operations such as Seq Scan (sequence scan), full table scan and the like. The content reviewed by review items of the execution plan review template is generally obtained from the basic information matched with the SQL sentence. For example, whether the review execution time is greater than the preset execution time, it needs to obtain the total number of executions and the total execution time from the basic information to obtain the average value, that is, the execution time. It needs to obtain the execution operation in the basic information to review the high cost operation. Each review item corresponds to a unique review item number. When the review is not passed, the unpassed review item number can be recorded.

The reviewing module 640 is further configured to analyze the parsed result grammatically in accordance with review items in the SQL grammar review template one by one, and review the parsed result and/or the basic information according to the analyzed result to obtain the review result.

The SQL grammar review template is configured to review the syntax and semantics of the SQL sentence itself. The review items of the SQL grammar review template may include prohibiting from using "select *", prohibiting from repeating the query clause, update while prohibiting from using the order by clause, update while must using the where clause, prohibiting from nesting the select clause, delete while must using the where clause, delete while prohibiting the order by clause, delete while prohibiting from using the limit clause and the like. The review items of prohibiting from repeating the query clause can improve the execution efficiency of the SQL sentence. The review items of update while prohibiting from using the order by clause, delete while prohibiting the order by clause and delete while prohibiting from using the limit clause can prevent from unnecessary ordering in DML (Data Manipulation Language) process. The review items of update while must using the where clause and delete while must using the where clause can prevent the full table lock in the DML process. The SQL tree parsed result is analyzed and reviewed in accordance with each review item in the SQL grammar review template one by one to obtain the review result.

Each review item in the preset review template can correspond to a different review value to score the reviewed SQL sentence. When the review item is not passed, the review values corresponding to the unpassed review items will be deducted from the total review values of the SQL sentence. After the review is completed, the final review value can be obtained. The degree that performance of the SQL sentence is good or bad can be clearly obtained by scoring the SQL sentence. For example, the review data corresponding to the slow query and the high cost operation in the execution plan review template are 1 point and 2 points respectively. The total review value of the SQL sentence is 100 points. If the SQL sentence does not satisfy the review items of the slow query, 1 point will be deducted, and the final review value is 99 points.

In the embodiment, the parsed result obtained by parsing the SQL sentence and/or the basic information matched with the SQL sentence is reviewed in accordance with the execution plan review template and the SQL grammar review template one by one. SQL in the database with the incomplete data dictionary information can be reviewed more deeply, so that the SQL review is more targeted and the accuracy of SQL review can be improved effectively.

Figure 8:
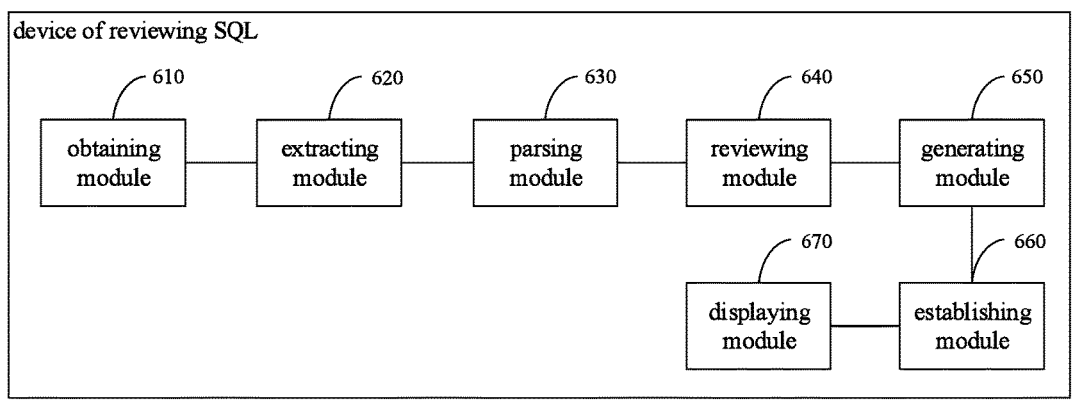
FIG. 8 is a block diagram of a device of reviewing SQL in another embodiment.

Referring to FIG. 8, in an embodiment, in addition to the obtaining module 610, the extracting module 620, the parsing module 630, the reviewing module 640 and the generating module 650, the above device of reviewing SQL further includes an establishing module 660 and a displaying module 670.

The establishing module 660 is configured to extract a SQL sentence the review result of which is not passed in the review result set to establish a SQL baseline.

The SQL baseline is configured to record data related to the SQL sentence the review result of which is not passed and the change process of status. The SQL baseline can include the SQL sentence content, the SQL number, the database name, the user name, the review item number the review result of which is not passed, the review status and the like. When the SQL baseline is established, the review status is non-pass. When the database administrator rectifies the SQL sentence, the review status can be modified as pass.

Figure 9:
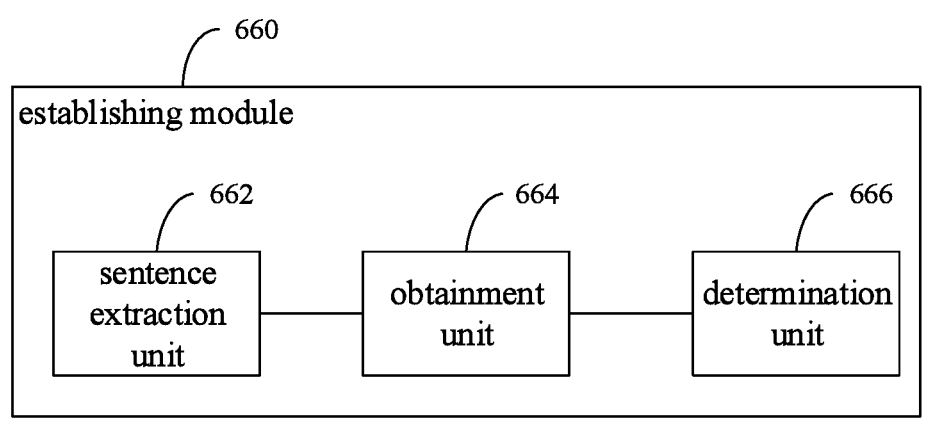
FIG. 9 is a block diagram of an establishing module in another embodiment.

Referring to FIG. 9, in an embodiment, the establishing module 620 includes a sentence extraction unit 662, an obtainment unit 664 and a determination unit 666.

The sentence extraction unit 662 is configured to extract the SQL sentence the review result of which is not passed in the review result set.

The obtainment unit 664 is configured to obtain a SQL number of the SQL sentence the review result of which is not passed and an unpassed review item number.

The server can extract the SQL sentence the review result of which is not passed in the review result set to establish the SQL baseline, can obtain the SQL sentence content and the SQL number of the SQL sentence the review result of which is not passed, the database name, the user name, the unpassed review item number and other information.

The determination unit 666 is configured to determine whether there is a matched SQL baseline according to the SQL number and the unpassed review item number; if yes, marking a status of the SQL baseline as non-pass; or else, establishing the SQL baseline according to the SQL number and the unpassed review item number.

Each unpassed review item of the SQL sentence can correspond to a unique SQL baseline, that is to say, each SQL baseline has a unique corresponding SQL number and an unpassed review item number. If there are a plurality of unpassed review items of the SQL sentence, it needs to establish a plurality of corresponding SQL baselines. After the server extracts the SQL sentence the review result of which is not passed in the review result set and obtain the SQL number and the unpassed review item number, it can firstly look up whether there is a corresponding SQL baseline in the review database according to the SQL number. If yes, then it further looks up whether there is a SQL baseline matched with the review item number from the SQL baseline corresponding to the SQL number. If yes, it does not need to reestablish the SQL baseline, and it only needs to modify the review status of the matched SQL baseline as non-pass.

The displaying module 670 is configured to analyze the SQL baseline to obtain SQL review data, and display the SQL review data.

The server can extract a newly established SQL baseline or a baseline the status of which is remarked as non-pass at a preset time interval from the review database during a preset time period to obtain the review data of SQL, such as at one-hour interval, at three-hour interval and the like. The SQL review data can include the SQL sentence content, the SQL number, the database name, the user name, the review item number the review result of which is not passed and other contents, and can be displayed by the terminal. The database administrator can modify the SQL sentence according to the displayed SQL review data to make it conform to the review item. After modification is completed, the review status of the SQL baseline can be modified according to the modified result. If the review item of the SQL sentence the review result is not passed has been modified, the review status of the SQL baseline matched with the modified review item number can be marked as pass. In other embodiments, a baseline report may be generated at a time period, for example, a baseline daily report is generated and a baseline monthly report is generated. All newly generated SQL baselines and the SQL baselines the review statuses of which have been modified are recorded in the baseline report during the time period, so that the database administrator is convenient to understand changes in the SQL baseline in the review database.

In the embodiment, the SQL sentence the review result of which is not passed is extracted in the review result set to establish the SQL baseline, so that the database administrator is convenient to modify the SQL sentence the review result of which is not passed in the database, which improves the efficiency of SQL review work efficiently, and facilitates enhancing data processing performance of the database.

Each module in the above device of reviewing SQL may be implemented in whole or in part by software, hardware, and combinations thereof. For example, in implementation of hardware, the above displaying module 670 can transmit SQL review data to the terminal by the network interface on the server, so that the terminal can display the SQL review data; the reviewing module 640 can review the parsed result and/or the basic information in accordance with review items in the preset review template one by one by the processor of the server; wherein, the processor may be a central processing unit (CPU), a microprocessor, or the like. Each module described above may be embedded in or independent from the processor in the server in the form of the hardware, or may be stored in the ROM in the server in the form of the software, so that the processor calls the operations performed by each module described above.

It can be understood by those skilled in the art that all or a part of the processes in the method of the embodiments described above may be accomplished by means of the associated hardwares instructed by a computer program, and the computer program may be stored in a computer readable storage apparatus. When the program is executed, an embodiment flow of each method described above may be included. The storage apparatus may be a magnetic disk, an optical disk, a read only memory (ROM).

Various features of the above embodiments can be combined in any manner. For simplicity of description, all possible combinations of various features in the above embodiments are not described. However, these combinations of these features should be regarded in the scope described in the specification as long as they do not contradict with each other.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of reviewing structured query language (SQL), comprising:
   obtaining slow log data;
   extracting a SQL sentence to be reviewed and basic information matched with the SQL sentence from the slow log data;
   identifying and parsing the SQL sentence to obtain a parsed result;
   reviewing the parsed result and/or the basic information in accordance with review items in a preset review template one by one to obtain a review result; and
   generating a review result set according to the review result;
   wherein after the generating the review result set according to the review result, the method further comprises:
   extracting a SQL sentence the review result of which is not passed in the review result set to establish a SQL baseline; and
   analyzing the SQL baseline to obtain SQL review data, and displaying the SQL review data.

2. The method of claim 1, wherein the extracting the SQL sentence to be reviewed and basic information matched with the SQL sentence from the slow log data comprises:
   analyzing the slow log data according to a preset format and generating a slow log data list; and
   extracting the SQL sentence to be reviewed and the basic information matched with the SQL sentence from the slow log data list according to a field name in the slow log data list.

3. The method of claim 1, wherein the preset review template comprises an execution plan review template;
   the reviewing the parsed result and/or the basic information in accordance with review items in the preset review template one by one to obtain the review result comprises:
   extracting data matched with review items in the execution plan review template in the basic information in accordance with the review items one by one, and reviewing the data to obtain the review result.

4. The method of claim 1, wherein the preset review template comprises a SQL grammar review template;
   the reviewing the parsed result and/or the basic information in accordance with review items in the preset review template one by one to obtain the review result comprises:
   analyzing the parsed result grammatically in accordance with review items in the SQL grammar review template one by one, and reviewing the parsed result and/or the basic information according to the analyzed result to obtain the review result.

5. The method of claim 1, wherein the extracting the SQL sentence the review result of which is not passed in the review result set to establish the SQL baseline comprises:
   extracting the SQL sentence the review result of which is not passed in the review result set;
   obtaining a SQL number of the SQL sentence the review result of which is not passed and an unpassed review item number; and
   determining whether there exists a matched SQL baseline according to the SQL number and the unpassed review item number; if yes, marking a status of the SQL baseline as non-pass; or else, establishing the SQL baseline according to the SQL number and the unpassed review item number.

6. A server, comprising a processor and a memory storing computer executable instructions that, when executed by the processor, cause the processor to perform operations comprising:
   obtaining slow log data;
   extracting a SQL sentence to be reviewed and basic information matched with the SQL sentence from the slow log data;
   identifying and parsing the SQL sentence to obtain a parsed result;
   reviewing the parsed result and/or the basic information in accordance with review items in a preset review template one by one to obtain a review result; and
   generating a review result set according to the review result;
   wherein after the step of generating the review result set according to the review result, the computer executable instructions, when executed by the processor, further cause the processor to perform operations comprising:
   extracting a SQL sentence the review result of which is not passed in the review result set to establish a SQL baseline; and
   analyzing the SQL baseline to obtain SQL review data, and displaying the SQL review data.

7. The server of claim 6, wherein the extracting the SQL sentence to be reviewed and basic information matched with the SQL sentence from the slow log data comprises:
   analyzing the slow log data according to a preset format and generating a slow log data list; and
   extracting the SQL sentence to be reviewed and the basic information matched with the SQL sentence from the slow log data list according to a field name in the slow log data list.

8. The server of claim 6, wherein the preset review template comprises an execution plan review template;
   the reviewing the parsed result and/or the basic information in accordance with review items in the preset review template one by one to obtain the review result comprising:
   extracting data matched with review items in the execution plan review template in the basic information in accordance with the review items one by one, and reviewing the data to obtain the review result.

9. The server of claim 8, wherein the preset review template comprises a SQL grammar review template;
   the reviewing the parsed result and/or the basic information in accordance with review items in the preset review template one by one to obtain the review result comprising:
   analyzing the parsed result grammatically in accordance with review items in the SQL grammar review template one by one, and reviewing the parsed result and/or the basic information according to the analyzed result to obtain the review result.

10. The server of claim 6, wherein the extracting the SQL sentence the review result of which is not passed in the review result set to establish the SQL baseline comprises:
   extracting the SQL sentence the review result of which is not passed in the review result set;
   obtaining a SQL number of the SQL sentence the review result of which is not passed and an unpassed review item number; and
   determining whether there is a matched SQL baseline according to the SQL number and the unpassed review item number; if yes, marking a status of the SQL baseline as non-pass; or else, establishing the SQL baseline according to the SQL number and the unpassed review item number.

* * * * *